(12) United States Patent
Nagasaka et al.

(10) Patent No.: US 10,384,170 B2
(45) Date of Patent: Aug. 20, 2019

(54) METHOD OF MANUFACTURE OF SEPARATION MEMBRANE STRUCTURE

(71) Applicant: NGK INSULATORS, LTD., Nagoya-Shi (JP)

(72) Inventors: Ryujiro Nagasaka, Nagoya (JP); Shinji Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 323 days.

(21) Appl. No.: 15/464,778

(22) Filed: Mar. 21, 2017

(65) Prior Publication Data

US 2017/0189863 A1    Jul. 6, 2017

Related U.S. Application Data

(63) Continuation of application No. PCT/JP2015/069824, filed on Jul. 10, 2015.

(30) Foreign Application Priority Data

Sep. 30, 2014  (JP) .................................. 2014-200556

(51) Int. Cl.
*B01D 63/06*    (2006.01)
*B01D 67/00*    (2006.01)
(Continued)

(52) U.S. Cl.
CPC ......... *B01D 71/028* (2013.01); *B01D 63/066* (2013.01); *B01D 67/0051* (2013.01);
(Continued)

(58) Field of Classification Search
None
See application file for complete search history.

(56) References Cited

U.S. PATENT DOCUMENTS

| 2004/0173094 A1 | 9/2004 | Nakayama et al. |
| 2009/0011296 A1 | 1/2009 | Yajima et al. |

(Continued)

FOREIGN PATENT DOCUMENTS

| JP | 08-257302 A1 | 10/1996 |
| JP | 2003-159518 A1 | 6/2003 |

(Continued)

OTHER PUBLICATIONS

Ken-ichi Okamoto, et al., "Zeolite NaA Membrane: Preparation, Single-Gas Permeation, and Pervaporation and Vapor Permeation of Water/Organic Liquid Mixtures," *Ind. Eng. Chem. Res.*, 2001, vol. 40, No. 1, pp. 163-175.

(Continued)

*Primary Examiner* — Mary Lynn F Theisen
(74) *Attorney, Agent, or Firm* — Burr & Brown, PLLC (57) ABSTRACT

A method of manufacturing a separation membrane structure comprising a step of forming a first to $n^{th}$ zeolite membranes on a surface of a porous substrate by "n" repetitions (wherein n is an integer greater than or equal to 2) of formation of a zeolite membrane by a method of hydrothermal synthesis. The following formula (1) is established in relation to the step of forming the first to the $n^{th}$ zeolite membranes. (Formula 1) $N_1/N_0+0.1 \leq T_{2\sim n}/T_1 \leq 2N_1/N_0+2$ (Wherein, $N_1$ denotes a permeation rate of a predetermined gas in the substrate after formation of the first zeolite membrane, $N_0$ denotes a permeation rate of a predetermined gas in the substrate before formation of the first zeolite membrane, $T_1$ is a time required for formation of the first zeolite membrane, and $T_{2\sim n}$ is a total time required for formation of the second to the $n^{th}$ zeolite membranes.)

6 Claims, 5 Drawing Sheets (51) Int. Cl.
  *B01D 69/04* (2006.01)
  *B01D 69/12* (2006.01)
  *B01D 71/02* (2006.01)
  *B28B 1/26* (2006.01)
  *B28B 3/02* (2006.01)
  *B28B 3/20* (2006.01)
  *B28B 11/04* (2006.01)
  *B28B 11/24* (2006.01)
  *C01B 39/46* (2006.01)
  *C01B 39/48* (2006.01)

(52) U.S. Cl.
  CPC .............. *B01D 69/04* (2013.01); *B01D 69/12* (2013.01); *B28B 1/26* (2013.01); *B28B 3/02* (2013.01); *B28B 3/20* (2013.01); *B28B 11/041* (2013.01); *B28B 11/243* (2013.01); *C01B 39/46* (2013.01); *C01B 39/48* (2013.01)

(56) References Cited

U.S. PATENT DOCUMENTS

2010/0144512 A1* 6/2010 Uchikawa ............ B01D 53/228
                                                         502/4
2010/0298115 A1    11/2010 Yajima et al.
2011/0301017 A1    12/2011 Niino et al.

FOREIGN PATENT DOCUMENTS

WO    2007/105407 A1    9/2007
WO    2009/113715 A1    9/2009
WO    2010/101035 A1    9/2010

OTHER PUBLICATIONS

Kenji Suzuki, et al., "Synthesis of Silicalite Membrane on Monolithic Support Using Hydrothermal Seeding Method," *The Japan Association of Zeolite*, Dec. 4, 2006, pp. 48 (with English translation).

International Search Report (Application No. PCT/JP2015/069824) dated Aug. 11, 2015.

English translation of the International Preliminary Report on Patentablity (Application No. PCT/JP2015/069824) dated Apr. 13, 2017.

* cited by examiner

METHOD OF MANUFACTURE OF SEPARATION MEMBRANE STRUCTURE

TECHNICAL FIELD

The present invention relates to a method of manufacturing a separation membrane structure that is provided with a zeolite membrane.

BACKGROUND ART

A conventional method is known of forming a zeolite membrane on an inner surface of a through hole that is formed in a porous substrate by a method of hydrothermal synthesis that uses zeolite seed crystals (reference is made to Japanese Patent Application Laid-Open No. 2003-159518, PCT Laid Open Application 2007/105407 and PCT Laid Open Application 2009/113715).

SUMMARY OF INVENTION

Technical Problem

However, the method disclosed in references has the problem that variations in the thickness of the zeolite membrane result in individual products during the same synthesis time as a result of differences in the deposition amount of the zeolite seed crystals to respective product items, or the pore radii of the substrate.

As a result, it is not possible to obtain a desired separation factor when the zeolite membrane is too thin and there is a tendency for cracks to be produced when the zeolite membrane is too thick.

The present invention is proposed based on the new insight above, and has the object of providing a method of manufacturing a separation membrane structure that enables control of the thickness of the zeolite membrane.

Solution to Problem

The manufacturing a separation membrane structure according to the present invention comprises a step of forming a first to $n^{th}$ zeolite membrane on the surface of a porous substrate by "n" repetitions (wherein n is an integer greater than or equal to 2) of formation of a zeolite membrane by a method of hydrothermal synthesis. The following formula (1) is established in relation to the step of forming the first to the $n^{th}$ zeolite membranes.

$$N_1/N_0 + 0.1 T_{2-n}/T_1 \leq 2N_1/N_0 + 2 \quad (1)$$

Wherein, in formula (1), $N_1$ denotes the permeation rate of a predetermined gas in a substrate after formation of the first zeolite membrane, $N_0$ denotes the permeation rate of a predetermined gas in a substrate before formation of the first zeolite membrane, $T_1$ is the time required for formation of the first zeolite membrane, and $T_{2-n}$ is the total time required for formation of the second to the $n^{th}$ zeolite membranes.

Advantageous Effects of Invention

The present invention provides a method of manufacturing a separation membrane structure that enables control of the thickness of the zeolite membrane.

DESCRIPTION OF EMBODIMENTS

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ. Therefore, the specific dimensions or the like should be determined by making reference to the following description. Alternatively, it is naturally the case that portions are included that exhibit a different ratio or relationship between dimensions in the respective figures.

Configuration of Separation Membrane Structure 100

Figure 1:
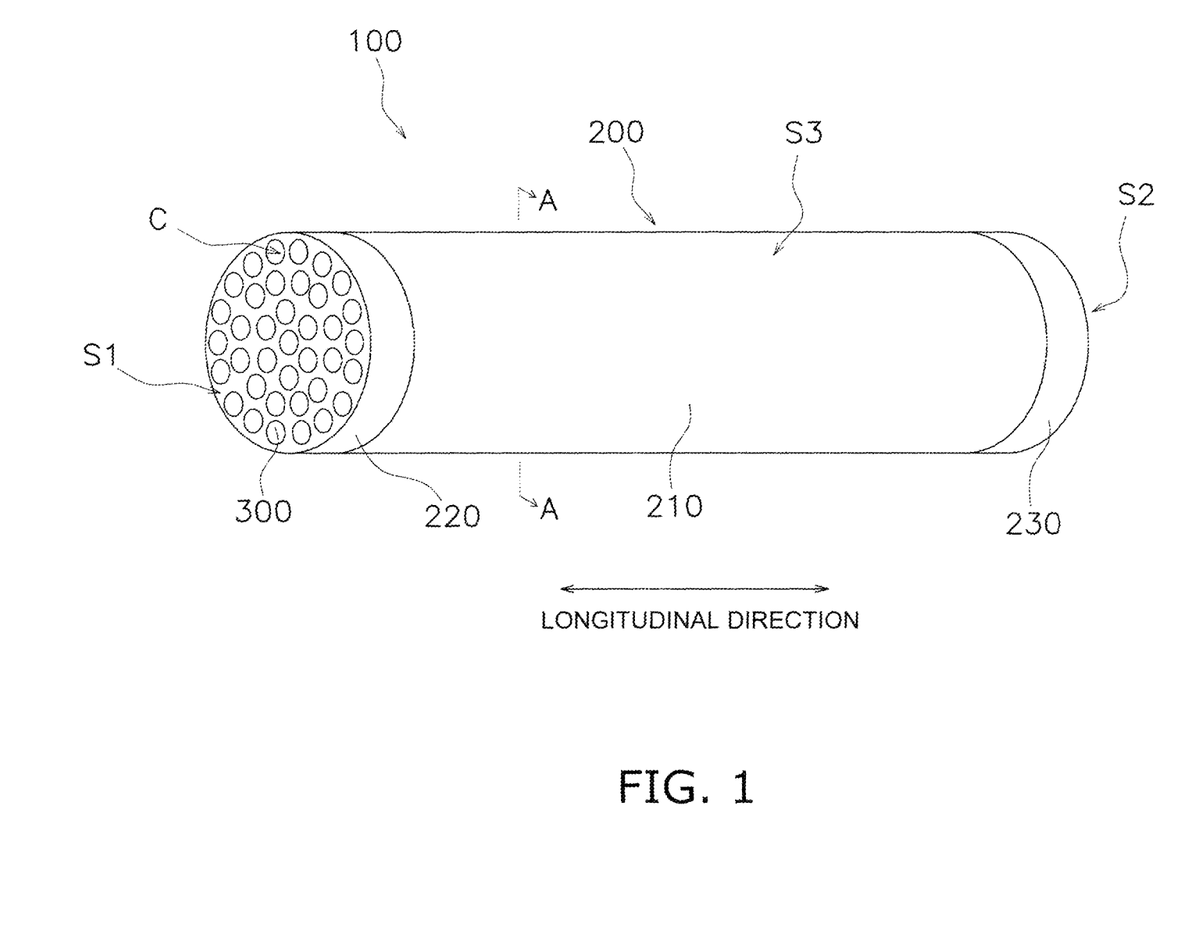
FIG. 1 is a perspective view of a separation membrane structure.
Figure 2:
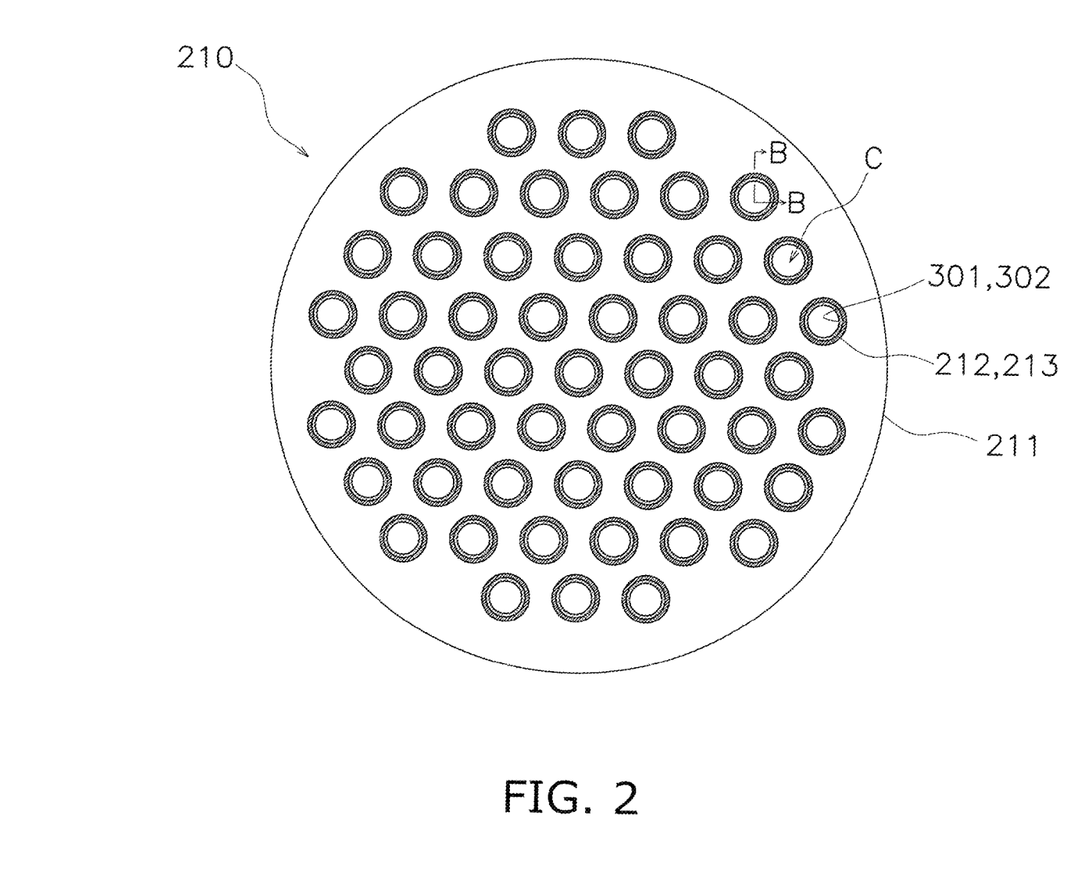
FIG. 2 is a cross sectional view of a separation membrane structure.
Figure 3:
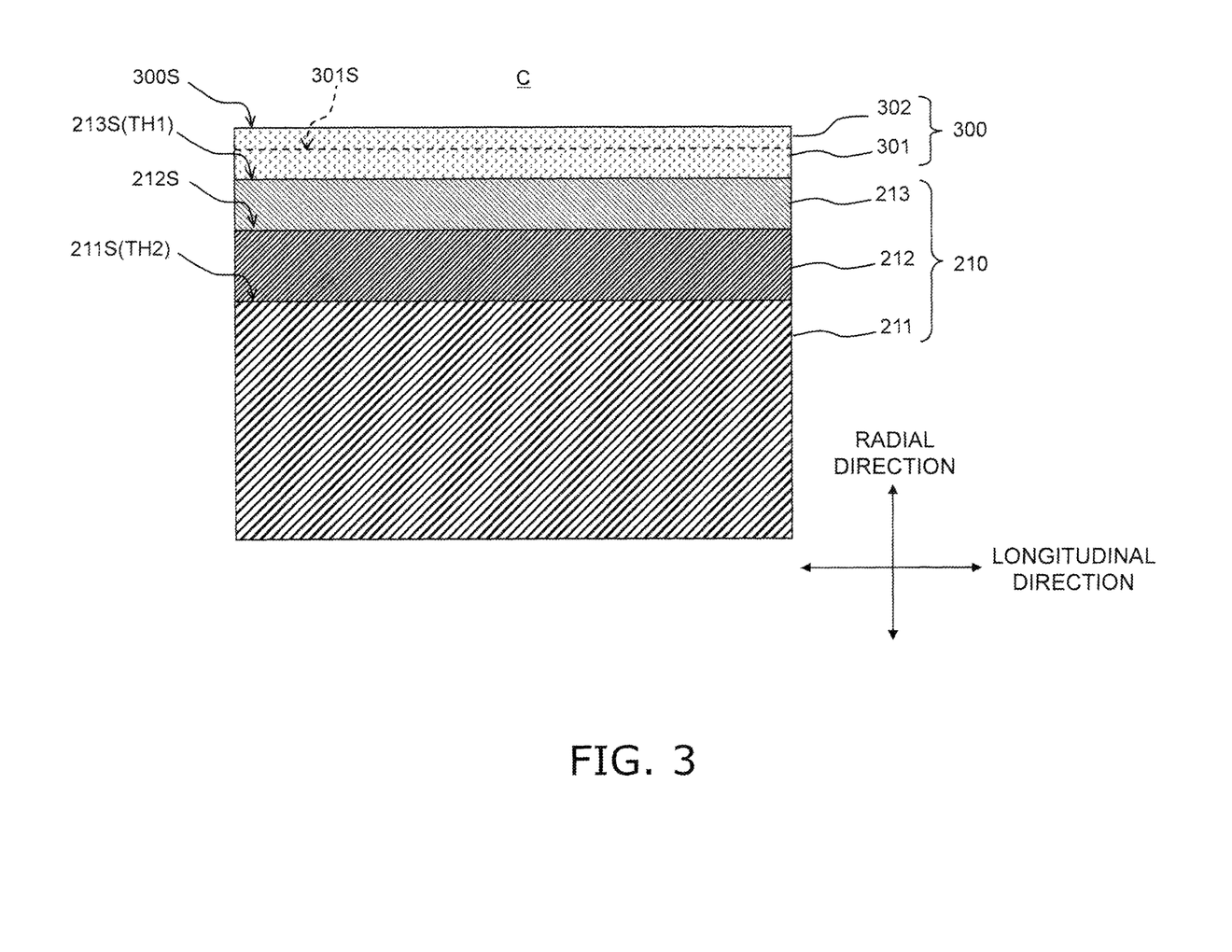
FIG. 3 is a partially enlarged view of FIG. 2.

FIG. 1 is a perspective view of a separation membrane structure 100. FIG. 2 is a cross sectional view along A-A, and FIG. 3 is a cross sectional view along B-B in FIG. 2.

The separation membrane structure 100 includes a substrate 200 and a zeolite membrane 300.

The substrate 200 includes a substrate main body 210, a first seal portion 220 and a second seal portion 230.

The substrate main body 210 is configured from a porous material. The substrate main body 210 is formed in the shape of a circular column. The length of the substrate main body 210 in a long direction may be configured as 150 to 2000 millimeters, and the diameter of the substrate main body 210 in a short direction may be configured as 30 to 220 millimeters. However there is no limitation in this regard.

The substrate main body 210 includes a first end surface S1, a second end surface S2, a side face S3 and a plurality of through holes TH1. The first end surface S1 is provided opposite the second end surface S2. The side face S3 is connected to an outer edge of the first end surface S1 and the second end surface S2. The plurality of through holes TH1 pass through an inner portion of the substrate main body 210 to thereby connect the first end surface S1 to the second end surface S2. The cross sectional shape of the through holes TH1 is circular, however there is no limitation in this regard. The inner diameter of the through holes TH1 may be configured as 1 to 5 millimeters.

As illustrated in FIG. 2 and FIG. 3, the substrate main body 210 is configured from a first support layer 212 and a second support layer 213.

A base 211 is formed in the shape of a circular column. A plurality of through holes TH2 is formed in the base 211. The base 211 is formed from a porous material. The porous material used in relation to the base 211 includes use of a ceramic, metal, resin or the like, and in particular, use of a porous ceramic material is suitable. The aggregate particles in the porous ceramic material include use of alumina ($Al_2O_3$), titania ($TiO_2$), mullite ($Al_2O_3 \cdot SiO_2$), potsherd, cordierite ($Mg_2Al_4Si_5O_{18}$), or the like. In consideration of commercial availability, clay stability and corrosion resistance, alumina is particularly suitable. The base 211 may include an inorganic binding agent in addition to the porous material. The inorganic binding agent includes use of at least one of titania, mullite, sinterable alumina, silica, glass frits, clay minerals, and sinterable cordierite. The porosity of the base 211 may be configured as 25% to 50%. The average pore diameter of the base 211 may be configured as 5 micrometers to 25 micrometers. The average pore diameter and the porosity of the base 211 may be measured by a mercury porosimeter. The average particle diameter of the porous material that configures the base 211 may be configured to 10 micrometers to 100 micrometers. In the present embodiment, the term "average particle diameter" denotes the value of the arithmetic mean for the maximum diameter of 30 measured particles that are measured by cross sectional micro-structure observation by use of a scanning electron microscope (SEM).

The first support layer 212 is formed on an inner surface 211S of the base 211 (through hole TH2). The first support layer 212 is formed in a cylindrical shape. The first support layer 212 is configured from a porous ceramic material (titania, alumina, or the like) in the same manner as the base 211. The thickness of the first support layer 212 in a direction that is perpendicular to the central axis of the through hole TH1 (referred to below as "radial direction") may be configured as 10 micrometers to 500 micrometers. The average pore diameter of the first support layer 212 may be smaller than the average pore diameter of the base 211, and may be configured for example to 0.005 micrometers to 2 micrometers.

The second support layer 213 is formed on an inner surface 212S of the first support layer 212. The second support layer 213 is formed in a cylindrical shape. The second support layer 213 is configured from a porous ceramic material (titania, alumina, or the like) in the same manner as the base 211. The thickness of the second support layer 213 in a radial direction may be configured as 5 micrometers to 300 micrometers. The average pore diameter of the second support layer 213 may be smaller than the average pore diameter of the first support layer 212, and may be configured for example to 0.003 micrometers to 0.5 micrometers.

A first seal portion 220 covers a portion of the side surface S3 and the entire surface of the first end surface S1 of the substrate main body 210. The first seal portion 220 inhibits direct infiltration, from the first end surface S1 to the substrate main body 210, of the mixed fluid to be filtered that flows into the cell C that is described below. The first seal portion 220 is formed so that a barrier is not formed in relation to the inflow port for the cells C. The material that configures the first seal portion 220 includes use of glass, metal, or the like. However, glass is preferred in light of adaptability with the thermal expansion coefficient of the substrate main body 210.

The second seal portion 230 covers a portion of the side surface S3 and the entire surface of the second end surface S2 of the substrate main body 210. The second seal portion 230 inhibits the direct infiltration, from the second end surface S2 to the substrate main body 210, of the mixed fluid that flows out of the cells C. The second seal portion 230 is formed so that a barrier is not formed in relation to the outflow port for the cells C. The second seal portion 230 may be configured by use of the same material as the first seal portion 220.

The zeolite membrane 300 is formed on an inner surface 213S of the second support layer 213 (through holes TH1). The separation membrane 300 is formed as a cylindrical tube. A space on an inner side of the inner surface 300S of the zeolite membrane 300 configures the cells C for enabling flow of the mixed fluid. Although there is no particular limitation in relation to the inner diameter of the cells C in the radial direction, it may be configured for example as 1 millimeter to 5 millimeters. Although there is no particular limitation in relation to the thickness of the zeolite membrane 300 in the radial direction, it is preferably less than or equal to 5 micrometers and more preferably less than or equal to 1 micrometer.

The zeolite membrane 300 has a crystal structure such as DDR, LTA, MFI, MOR, FER, FAU, CHA, BEA, or the like. In a configuration in which the zeolite membrane 300 has a DDR crystal structure, suitable use is enabled as a gas separation membrane for selective separation of carbon dioxide.

In this context, the zeolite membrane 300 is configured from a first zeolite membrane 301 and a second zeolite membrane 302. The first zeolite membrane 301 is formed on an inner surface 213S of a second support layer 213 (through hole TH1). The second zeolite membrane 302 is formed on an inner surface 301S of the first zeolite membrane 301. The second zeolite membrane 302 is formed on an inner surface 300S of the zeolite membrane 300. However, the inner surface 301S of the first zeolite membrane 301 shown by the broken line in FIG. 3 (interface of the first zeolite membrane 301 and the second zeolite membrane 302) is an imaginary line for the purposes of description, and an interface between those two elements is not actually formed. The method of manufacturing the zeolite membrane 300 is described below.

Method of Manufacturing Separation Membrane Structure 100

Firstly, a green body for the base 211 that includes a plurality of through holes TH2 is formed using clay that includes a porous material. The method of forming the green body for the base 211 includes use of an extrusion molding method using a vacuum extrusion molding device, in addition to a press molding method or a slip cast Method.

Next, the green body for the base 211 is fired (for example, 900 degrees C. to 1450 degrees C., 1 hour to 100 hours) to thereby form the base 211.

Next, additives such as a porous material, an organic binder, a pH adjusting agent, and a surface active agent, or the like are added to thereby prepare a first support layer slurry.

Then, the first support layer slurry is used to form a green body for the first support layer 212 using a filtration method or flow down method, or the like. More specifically, the first support layer slurry is supplied to the through holes TH2 of the base 211 and drawn by use of a pump from the side surface S3 of the base 211 to deposit a green body for the first support layer 212 on the inner surface 211S of the base 211.

Thereafter, the green body for the first support layer 212 is fired (for example, 900 degrees C. to 1450 degrees C., 1 hour to 100 hours) to thereby form the first support layer 212.

Next, a second support layer slurry is prepared by adding a porous material, an organic binder, a pH adjusting agent and a surface active agent, or the like.

Next, a green body for the second support layer 213 is formed by a filtration method, a flow down method or the like using the second support layer slurry. More specifically, the second support layer slurry is supplied to an inner side of the cylindrical first support layer 212, and drawn by use of a pump from the side surface S3 of the base 211 to thereby form a green body for the second support layer 213 on the inner surface 212S of the first support layer 212.

Thereafter, the green body for the second support layer 213 is fired (for example, 900 degrees C. to 1450 degrees C., 1 hour to 100 hours) to thereby form the second support layer 213. The substrate main body 210 is completed in the above manner.

Next glass frit is mixed with an organic binder to thereby prepare a glass seal slurry.

Then the glass seal slurry is coated onto both ends of the substrate main body 210 to thereby form a green body for the first and second seal portions 220, 230.

The green body for the first and second seal portions 220, 230 is fired (800 to 1000 degrees C., 1 hour to 100 hours) to thereby form the first and second seal portions 220, 230. The substrate 200 is completed in the above manner.

Next, the permeation rate $N_0$ of a predetermined gas in the substrate 200 is measured for future reference. The permeation rate $N_0$ may be calculated based on the differential pressure between the supply-side pressure (pressure on an inner side of the through holes TH1) and a permeation-side pressure (pressure on an outer side of the side surface S3) when a predetermined gas is supplied to the inner side of the second support surface 213 (through hole TH1). The predetermined gas includes use of nitrogen gas, helium gas, $SF_6$ gas, $CF_4$ gas, methane gas, or the like, and a mixed gas thereof.

Then, a zeolite membrane 300 is formed on an inner surface 213S of the second support layer 213 (through hole TH1). More specifically, a first to an $n^{th}$ zeolite membrane is formed on an inner surface of the through hole TH1 by n repetitions (wherein n is an integer greater than or equal to 2) of formation of a zeolite membrane by a method of hydrothermal synthesis. In the present embodiment, n=2, and the first zeolite membrane 301 and the second zeolite membrane 302 are formed in sequence. The steps for the formation of the first zeolite membrane 301 and the second zeolite membrane 302 will be described below.

Firstly, a starting material solution is prepared by mixing silica, 1-adamantane amine (a structure regulating agent), ethylene diamine and water. The molar ratio of 1-adamantane amine to silica may be configured as 0.002 to 0.4, the molar ratio of water to silica may be configured as 10 to 500, and the molar ratio of ethylene diamine to 1-adamantane amine may be configured as 5 to 32.

Next, a zeolite powder (zeolite seed crystal) is deposited on an inner surface of the through hole TH1 of the substrate 200.

Hydrothermal synthesis is performed by immersing the substrate 200 in a pressure resistant container containing the starting material solution. The synthesis temperature may be 110 to 200 degrees C., and is preferably 120 degrees C. to 140 degrees C. The synthesis time may be 0.5 to 300 hours, and is preferably 3 hours to 50 hours. In this manner, a first zeolite membrane 301 is formed on the inner surface 213S of the through holes TH1 of the substrate 200.

Next, the permeation rate $N_1$ of a predetermined gas in the substrate 200 that forms the first zeolite membrane 301 is measured. The permeation rate $N_1$ may be calculated based on the differential pressure between the supply-side pressure (pressure on an inner side of the first zeolite membrane 301) and a permeation-side pressure (pressure on an outer side of the side surface S3) when a predetermined gas is supplied to the inner side of the first zeolite membrane 301. At that time the same gas is used as the gas that was used in the measurement of the permeation rate $N_0$ of the substrate 200. A total time $T_{2-n}$ required for the hydrothermal synthesis on the second and subsequent occasions is determined to thereby satisfy the following formula (1).

Formula 1

$$N_1/N_0+0.1 \leq T_{2-n}/T_1 \leq 2N_1/N_0+2 \qquad (1)$$

As discussed above, $N_1$ denotes the permeation rate of a predetermined gas in the substrate 200 after forming the first zeolite membrane 301, $N_0$ denotes the permeation rate of a predetermined gas in the substrate 200 before forming the first zeolite membrane 301, and $T_1$ denotes the time required for formation of the first zeolite membrane 301.

Next, a starting material solution is prepared that includes silica, 1-adamantane amine, and ethylene diamine and water. The starting material solution is preferably the same starting material solution that was used in relation to the first zeolite membrane 301. However, the composition of the starting material solution may be slightly different. For example, the silica concentration in the starting material solution may fall within the range of ∓50% of the silica concentration of the starting material solution used in relation to the first zeolite membrane 301. The 1-adamantane amine concentration in the starting material solution may fall within the range of ∓50% of the 1-adamantane amine concentration of the starting material solution used in relation to the first zeolite membrane 301.

Then, hydrothermal synthesis is performed by immersing the substrate 200 with the first zeolite membrane 301 formed thereon in a pressure resistant container containing the starting material solution. The synthesis time $T_{2-n}$ may be set within a range determined in accordance with formula (1) above. The synthesis temperature may be 110 to 200 degrees C., but preferably falls within the range of ∓3 degrees C. of the synthesis temperature for the first zeolite membrane 301. In this manner, the second zeolite membrane 302 may be integrally formed on the inner surface of the first zeolite membrane 301.

Other Embodiments

Although an embodiment of the present invention has been described, the present invention is not limited to the above embodiment, and various modifications are possible within a scope that does not depart from the spirit of the invention.

(A) In the above embodiment, the substrate 200 is configured to include the substrate main body 210, the first seal portion 220, and the second seal portion 230. However, a configuration is possible that includes only one of the first seal portion 220 and the second seal portion 230.

(B) In the above embodiment, the substrate main body 201 is configured to include the base 211, the first support layer 212 and the second support layer 213. However, a configuration is possible that includes only one of the first support layer 212 and the second support layer 213. In a configuration in which the substrate main body 210 does not include a second support layer 213, the inner cavity of the first support layer 212 becomes the through hole TH1, and the zeolite membrane 300 is formed on the inner surface 212S of the first support layer 212. Furthermore, in a configuration in which the substrate main body 210 does not include the first support layer 212 and the second support layer 213, the through hole TH2 of the base 211 becomes the through hole TH1, and the zeolite membrane 300 is formed on the inner surface 211S of the base 211. In addition, the substrate main body 210 may further include one or more support layers formed on the second support layer 213. The one or more support layers formed on the second support layer 213 may be configured by a porous ceramic material that can be used in relation to the base 211.

(C) In the above embodiment, although the zeolite membrane 300 is configured with a two layer structure formed from the first zeolite membrane 301 and the second zeolite membrane 302, as clearly shown in formula (1) above, the zeolite membrane 300 may have a structure of three or more layers. In such a configuration, the total time $T_{2-n}$ for hydrothermal synthesis of the second to $n^{th}$ zeolite membrane 302 to 30$n$ is determined based on formula (1), and the total time for hydrothermal synthesis on the second and subsequent occasions may be arbitrarily allocated.

(D) In the above embodiment, although it has been described that the permeation rate $N_1$, $N_0$ of a predetermined gas in the substrate 200 before and after the formation of the first zeolite membrane 301 is measured on a plurality of occasions, there is no limitation in this regard. For example, since the pore diameter of the substrate 200 tends to undergo variation with reference to individual lots, the permeation rate $N_1$, $N_0$ is measured when the lot of substrate 200 changes to thereby determine the total time $T_{2-n}$, and enable use of that total time $T_{2-n}$ in the period until the lot of the substrate 200 changes. Furthermore, since the deposition amount of the zeolite seed crystals tends to vary in respective starting material solutions, the permeation rate $N_0$ is measured when the lot of the starting material solution changes to thereby determine the total time and enable use of that total time $T_{2-1}$, in the period until the lot of the starting material solution changes.

(E) In the above embodiment, although the zeolite powder (zeolite seed crystals) are deposited onto the inner surface of the through hole TH1 of the substrate 200, a starting material solution may be used in which the zeolite powder is dispersed in advance.

(F) In the above embodiment, although the cross sectional surface of the cell C was configured to be circular, an oval, rectangular or polygonal shape may also be used.

(G) In the above embodiment, although the substrate 200 has been formed in the shape of a circular column forming a plurality of through holes TH1, there is no limitation in this regard. The substrate 200 may be formed in a cylindrical shape forming a single through hole. In this configuration, the zeolite membrane 300 may be formed on the inner surface or the outer surface of the through hole. Furthermore, the substrate 200 may be formed in a tabular shape without through holes. In this configuration, the zeolite membrane 300 maybe formed on the outer surface of the substrate 200. In this manner, the zeolite membrane 300 may be formed on the surface (including the inner surface and outer surface) of the base 211.

EXAMPLES

The examples of the present invention will be described below. However, the present invention is not thereby limited to the following examples.

Preparation of Test Nos. 1 to 13

A monolithic separation membrane structure according to Test Nos. 1 to 28 is prepared as described below.

Firstly, a monolithic substrate having a plurality of through holes is prepared for each sample.

Then a permeation rate $N_0$ of nitrogen gas in the monolithic substrate is measured based on the differential pressure between the supply-side pressure and the permeation-side pressure when nitrogen gas is supplied to each through hole. The measurement results for the permeation rate $N_0$ are shown in Table 1.

Next, a starting material solution is prepared by mixing silica, 1-adamantane amine (a structure regulating agent), ethylene diamine and water. The proportion of each component is 51:2:13:160 with reference to a weight ratio.

Next, a DDR zeolite powder is deposited onto the inner surface of each through hole by causing a slurry containing a mixture of the DDR zeolite powder in a solvent such as water or the like to flow into each through hole and then draught drying the slurry. The specific surface area and the deposition amount of the DDR zeolite powder are shown in Table 1.

Then, a monolithic substrate is immersed inside a pressure resistant container containing the starting material solution and hydrothermal synthesis is performed at a synthesis temperature and a synthesis time $T_1$ as shown in Table 1 to thereby form a first DDR zeolite membrane.

Then a permeation rate $N_1$ of nitrogen gas in the monolithic substrate forming the first DDR zeolite membrane is measured based on the differential pressure between the supply-side pressure and the permeation-side pressure when nitrogen gas is supplied to the inner side of the first DDR zeolite membrane. The measurement results for the permeation rate $N_1$ are shown in Table 1.

Then, a monolithic substrate is immersed in a pressure resistant container containing the same starting material solution as the first DDR zeolite membrane and hydrothermal synthesis is performed at a synthesis temperature that is the same as that used for the first DDR zeolite membrane and a synthesis time $T_2$ as shown in Table 1 to thereby form a second DDR zeolite membrane.

Then a permeation rate $N_2$ of nitrogen gas in the monolithic substrate forming the second DDR zeolite membrane is measured based on the differential pressure between the supply-side pressure and the permeation-side pressure when nitrogen gas is supplied to the inner side of the second DDR zeolite membrane. The measurement results for the permeation rate $N_2$ are shown in Table 1.

Measurement of Separation Factor

Figure 4:
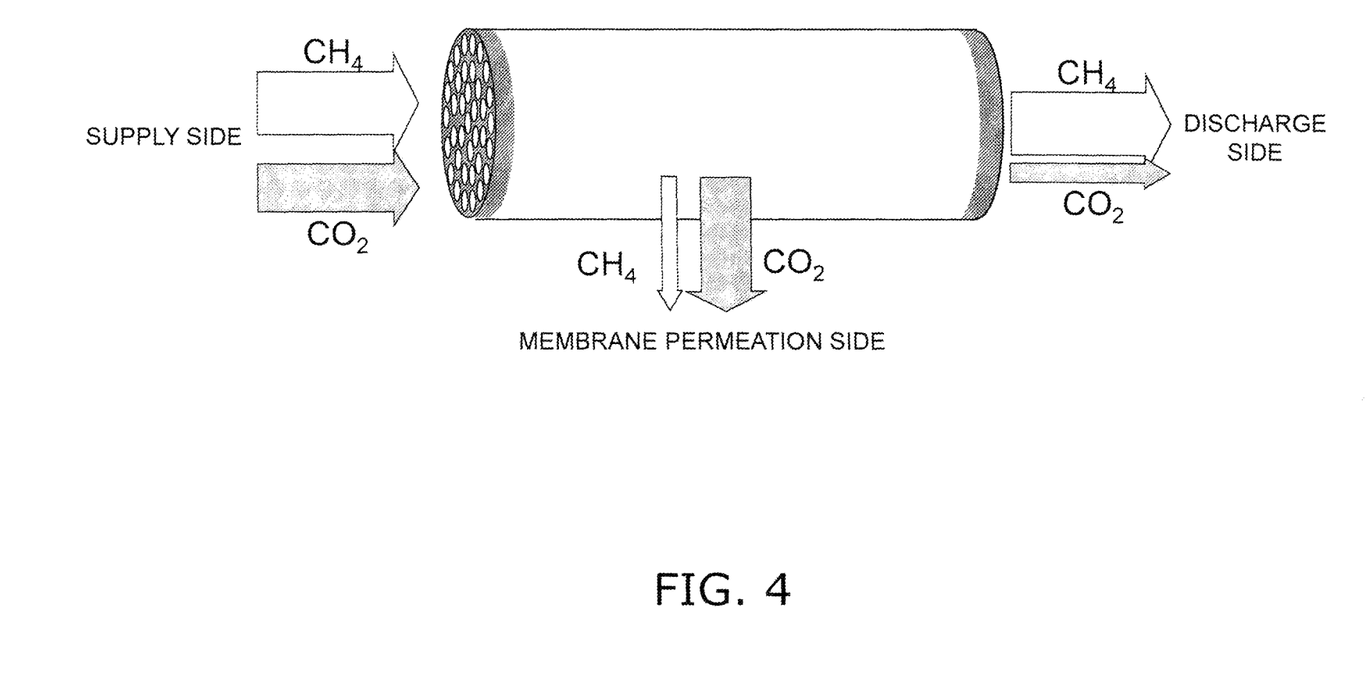
FIG. 4 is a schematic view illustrating the method of calculation of the separation factor α.

Firstly as shown in FIG. 4, carbon dioxide and methane are caused to flow in an inner portion (that is to say, a cell) of the DDR zeolite membrane of each sample to thereby measure the gas concentration on the permeation side and the supply side separating by the zeolite membrane. A separation factor $\alpha$ is calculated based on the following formula (2).

(Formula 2)

$\alpha$=(concentration of $CO_2$ on permeation-side/concentration of $CH_4$ on permeation-side)/(concentration of $CO_2$ on supply-side/concentration of $CH_4$ on supply-side)  (2)

The calculation results for the separation factor $\alpha$ are shown in Table 1. The separation factor $\alpha$ shown in Table 1 is a value that is normalized with reference to a predetermined value.

TABLE 1

| TEST No. | Nitrogen Gas permeation rate $N_0$ of Substrate [L/min·m²·kPa] | Specific Surface Area of DDR-type Zeolite Powder [m²/g] | Deposition Amount of DDR-type Zeolite Powder [g/m²] | Synthesis Temperature of First DDR-type Zeolite Membrane [°C.] | Synthesis Time $T_1$ of First DDR-type Zeolite Membrane [h] |
|---|---|---|---|---|---|
| 1 | 16.9 | 20 | 0.30 | 138 | 12 |
| 2 | 15.5 | 29 | 0.09 | 138 | 10 |
| 3 | 24.2 | 19 | 0.10 | 136 | 20 |
| 4 | 27.2 | 20 | 0.03 | 138 | 20 |
| 5 | 23.6 | 20 | 0.03 | 138 | 20 |
| 6 | 21.2 | 20 | 0.03 | 138 | 20 |
| 7 | 24.2 | 20 | 0.03 | 138 | 26 |
| 8 | 18.1 | 20 | 0.03 | 138 | 20 |
| 9 | 19.8 | 19 | 0.03 | 137 | 20 |
| 10 | 24.8 | 19 | 0.03 | 137 | 20 |
| 11 | 24.2 | 19 | 0.03 | 137 | 20 |
| 12 | 28.5 | 19 | 0.10 | 138 | 8 |
| 13 | 24.9 | 19 | 0.10 | 137 | 26 |
| 14 | 28.5 | 19 | 0.10 | 137 | 20 |
| 15 | 18.1 | 19 | 0.10 | 137 | 20 |
| 16 | 28.0 | 39 | 0.03 | 138 | 8 |
| 17 | 26.5 | 39 | 0.25 | 138 | 8 |
| 18 | 18.3 | 20 | 0.25 | 135 | 12 |
| 19 | 18.3 | 20 | 0.30 | 135 | 10 |
| 20 | 25.4 | 39 | 0.006 | 135 | 44 |
| 21 | 26.3 | 19 | 0.10 | 130 | 20 |
| 22 | 15.5 | 29 | 0.09 | 138 | 10 |
| 23 | 16.9 | 20 | 0.31 | 138 | 8 |
| 24 | 27.3 | 39 | 0.006 | 135 | 44 |
| 25 | 27.8 | 20 | 0.027 | 138 | 12 |
| 26 | 28.6 | 20 | 0.054 | 130 | 10 |
| 27 | 25.3 | 19 | 0.006 | 137 | 10 |
| 28 | 25.3 | 19 | 0.006 | 137 | 25 |

| TEST No. | Nitrogen Gas permeation rate $N_1$ after Formation of First DDR-type Zeolite Membrane [L/min·m²·kPa] | Synthesis Time $T_2$ of Second DDR-type Zeolite Membrane [h] | Nitrogen Gas permeation rate $N_2$ after Formation of Second DDR-type Zeolite Membrane [L/min·m²·kPa] | Separation factor α | $N_1/N_0$ | $T_2/T_1$ |
|---|---|---|---|---|---|---|
| 1 | 0.145 | 11 | 0.00001 | 166 | 0.01 | 0.90 |
| 2 | 0.489 | 17 | 0.00029 | 285 | 0.03 | 1.70 |
| 3 | 6.80 | 11 | 0.00020 | 192 | 0.28 | 0.55 |
| 4 | 4.10 | 11 | 0.00023 | 135 | 0.15 | 0.55 |
| 5 | 4.33 | 14 | 0.00018 | 194 | 0.18 | 0.70 |
| 6 | 4.82 | 15 | 0.00007 | 240 | 0.23 | 0.75 |
| 7 | 0.06 | 14 | 0.00008 | 177 | 0.002 | 0.54 |
| 8 | 9.07 | 20 | 0.00005 | 202 | 0.50 | 1.00 |
| 9 | 4.45 | 7 | 0.00149 | 114 | 0.22 | 0.35 |
| 10 | 8.26 | 11 | 0.00065 | 127 | 0.33 | 0.55 |
| 11 | 6.80 | 11 | 0.00020 | 192 | 0.28 | 0.55 |
| 12 | 1.36 | 5 | 0.00062 | 113 | 0.05 | 0.63 |
| 13 | 3.06 | 6 | 0.00010 | 204 | 0.12 | 0.23 |
| 14 | 1.20 | 3 | 0.00003 | 139 | 0.04 | 0.15 |
| 15 | 9.07 | 12 | 0.00001 | 149 | 0.50 | 0.60 |
| 16 | 7.95 | 20 | 0.00007 | 189 | 0.28 | 2.50 |
| 17 | 3.66 | 18 | 0.00439 | 105 | 0.14 | 2.25 |
| 18 | 8.90 | 18 | 0.00001 | 217 | 0.49 | 1.50 |
| 19 | 7.54 | 25 | 0.00052 | 126 | 0.41 | 2.50 |
| 20 | 7.50 | 90 | 0.00032 | 284 | 0.30 | 2.05 |
| 21 | 14.4 | 60 | 0.00024 | 203 | 0.55 | 3.00 |
| 22 | 0.466 | 23 | 0.00001 | 20 | 0.03 | 2.30 |
| 23 | 3.90 | 23 | 0.00010 | 5 | 0.23 | 2.81 |
| 24 | 1.98 | 5 | 0.31500 | — | 0.07 | 0.11 |
| 25 | 15.5 | 4 | 2.18306 | — | 0.56 | 0.33 |
| 26 | 7.68 | 1 | 0.35613 | — | 0.27 | 0.10 |
| 27 | 9.44 | 30 | 0.00001 | 8 | 0.37 | 3.00 |
| 28 | 14.3 | 90 | 0.00001 | 12 | 0.57 | 3.60 |

As shown in Table 1, Test Nos. 1 to 21 exhibit a superior result in relation to both permeation rate $N_2$ and separation factor α. On the other hand, Test Nos. 22, 23, 27 and 28 exhibit a conspicuously low separation factor α, and in Test Nos. 24 to 26, the permeation rate $N_2$ is conspicuously low. The reason why the separation factor α in Test Nos. 22, 23, 27 and 28 is low is due to the fact that cracks are formed since the second DDR zeolite membrane is too thick. Furthermore, the reason why the permeation rate $N_2$ in Test Nos. 24 to 26 is large is due to the fact that defects are caused since the second DDR zeolite membrane is too thin.

Figure 5:
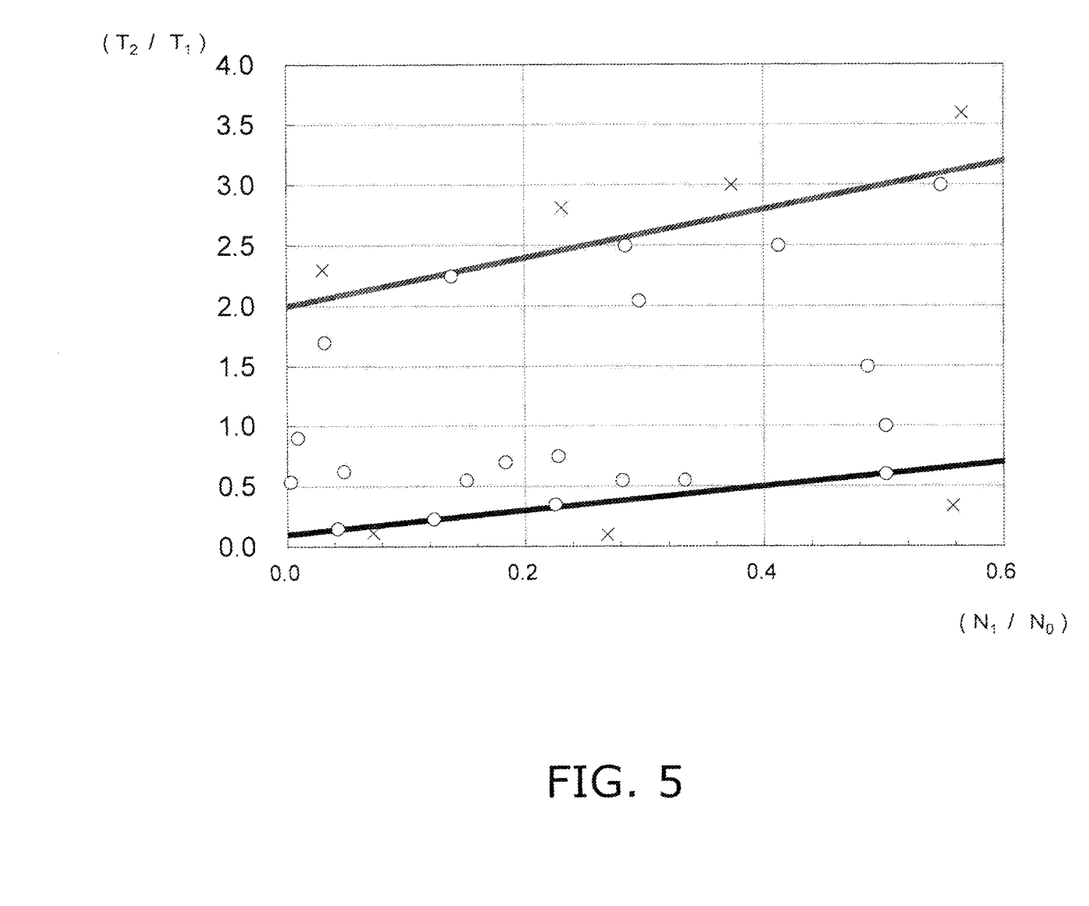
FIG. 5 is a graph wherein $N_1/N_0$ is the X axis and $T_2/T_1$ is the Y axis.

In this context, FIG. 5 is a graph wherein $N_1/N_0$ is the X axis and $T_2/T_1$ is the Y axis. As shown in FIG. 5, in Test Nos. 1 to 21 that exhibit superior results $T_2/T_1$ falls within the range of greater than or equal to $N_1/N_0+0.1$, and greater than or equal to $2N_1/N_0+2$. These results show that it is preferred that $T_{2-n}/T_1$ falls within the range of Formula (1) above.

The invention claimed is:

1. A method of manufacturing a separation membrane structure comprising steps of
    measuring a permeation rate of a predetermined gas in a porous substrate,
    forming a first zeolite membrane on a surface of the substrate by hydrothermal synthesis using zeolite seed crystals,
    measuring a permeation rate of the predetermined gas in the substrate after formation of the first zeolite membrane, and
    forming a second to nth zeolite membranes on the first zeolite membrane by hydrothermal synthesis to satisfy Formula (1) below, (Formula 1)

$$N_1/N_0+0.1 \leq T_{2-n}/T_1 \leq 2N_1/N_0+2 \quad (1)$$

wherein, n is an integer greater than or equal to 2, $N_1$ denotes a permeation rate of a predetermined gas in the substrate after formation of the first zeolite membrane, $N_0$ denotes a permeation rate of a predetermined gas in the substrate before formation of the first zeolite membrane, $T_1$ is a time required for formation of the first zeolite membrane, and $T_{2-n}$ is a total time required for formation of the second to the nth zeolite membranes.

2. The method of manufacturing a separation membrane structure according to claim 1, wherein
    the first to $n^{th}$ zeolite membranes are DDR zeolite membranes.

3. The method of manufacturing a separation membrane structure according to claim 1, wherein
    the substrate has a plurality of through holes, and
    the first to $n^{th}$ zeolite membranes are formed on an inner surface of a plurality of respective through holes.

4. The method of manufacturing a separation membrane structure according to claim 1, wherein
    the synthesis temperature of the respective second to $n^{th}$ zeolite membranes is within $\mp 3$ degrees C. of the synthesis temperature in the step for formation of the first zeolite membrane.

5. The method of manufacturing a separation membrane structure according to claim 1, wherein
    the synthesis temperature of the first to $n^{th}$ zeolite membranes is 120 degrees C. to 140 degrees C.

6. The method of manufacturing a separation membrane structure according to claim 1, wherein
    the synthesis time of the respective first to $n^{th}$ zeolite membranes is 3 hours to 50 hours.

* * * * *